Figure 2:
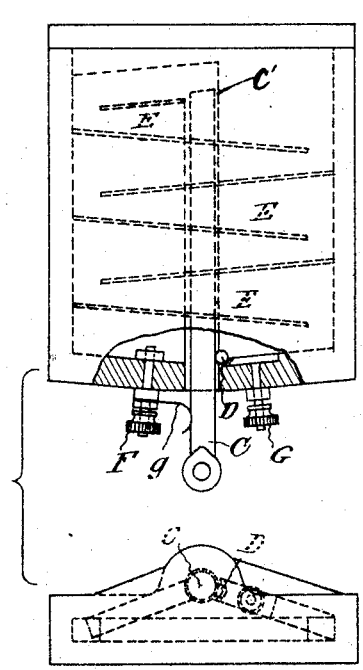

No. 786,907. PATENTED APR. 11, 1905.
W. W. LACKIE, W. T. CALDERWOOD & W. H. D. MacEWEN.
ELECTRIC TIME RELAY SWITCH.
APPLICATION FILED APR. 26, 1904.
3 SHEETS—SHEET 1.
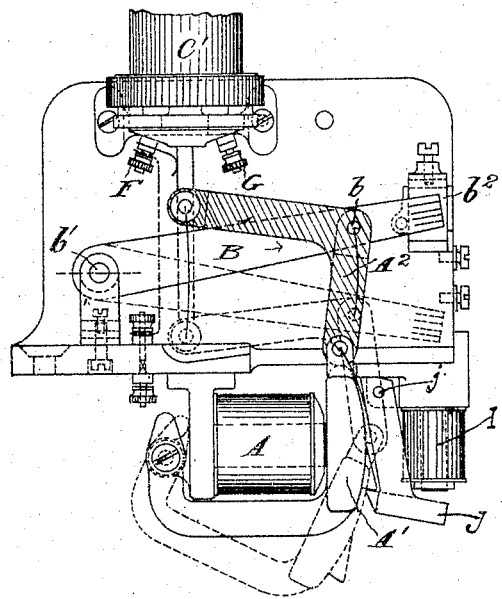
Fig. 1ª
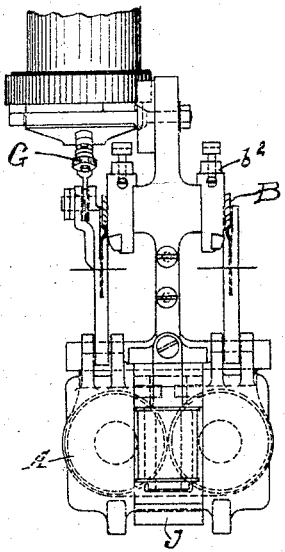
Fig. 1ᵇ
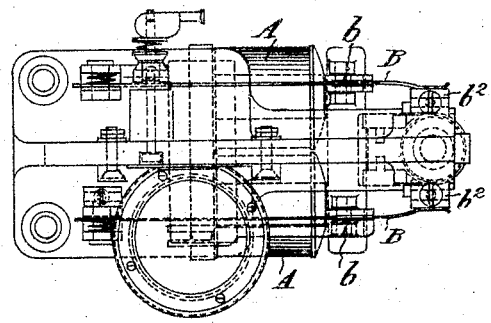
Fig. 1ᶜ
Witnesses.
O. Knight, Jr.
Jno. R. Adams
Inventors.
W. W. Lackie,
W. T. Calderwood,
and W. H. D. MacEwen.
by Knight Bros.
Attys.

No. 786,907. PATENTED APR. 11, 1905.
W. W. LACKIE, W. T. CALDERWOOD & W. H. D. MacEWEN.
ELECTRIC TIME RELAY SWITCH.
APPLICATION FILED APR. 26, 1904.

3 SHEETS—SHEET 2.

No. 786,907. Patented April 11, 1905.

UNITED STATES PATENT OFFICE.

WILLIAM WALKER LACKIE, WILLIAM TANNAHILL CALDERWOOD, AND WILLIAM HENRY DUNCAN MacEWEN, OF GLASGOW, SCOTLAND.

ELECTRIC TIME RELAY-SWITCH.

SPECIFICATION forming part of Letters Patent No. 786,907, dated April 11, 1905.

Application filed April 26, 1904. Serial No. 204,986.

*To all whom it may concern:*

Be it known that we, WILLIAM WALKER LACKIE, WILLIAM TANNAHILL CALDERWOOD, and WILLIAM HENRY DUNCAN MACEWEN, electrical engineers, of 75 Waterloo street, in the city of Glasgow, Scotland, have invented certain new and useful Improvements in and Connected with Electric Time Relay-Switches, of which the following is a specification.

This electric relay time-switch is to be applied for the closing of an electric circuit or circuits, thus allowing currents to pass through a group of lamps or to any other point where a supply of electricity may be required. It can, further, be manipulated from a distant point, and one switch may be arranged so as to actuate another and similar switch, and this may be repeated as often as is necessary and arranged in a series in such a way that each switch on closing its circuit will after a predetermined interval of time close a secondary circuit, which will actuate the next switch.

The switch consists principally of two parts—viz., first, a main switch proper controlled by an electromagnet A, and, second, the time-element mechanism, which closes a secondary circuit after a predetermined interval, thus actuating the main switch of the next switch in the series. From any central or suitable point a series of lamps may be switched into circuit set after set of the series, with a time interval between the switching in of the various sets. On the last of the sets being switched in contact is automatically made to indicate at the central switching-point that the circuits have been completed throughout the entire series. The interval of time obtained between the lighting one set or group of arc-lamps and another set or group of arc-lamps permits of the electric current being steadied to obviate flickering of the lamps.

The electromagnetic switch is actuated by a powerful horseshoe-electromagnet rotating a suitably-mounted armature, which is pivoted by suitable arms to a firm support or supports. This armature is coupled by insulated connecting-pieces to one or more suitably-mounted switches, which are provided with suitable carbon contacts or resistance-coils for minimizing the spark on severing the current. One of the switch coupling-pieces is supplied with a suitably-constructed arm, which is coupled to a metal plunger device which actuates the time-element mechanism. Suitable shields are provided, so that accidental contacts between the positive and negative terminals or between the positive or negative terminals and the middle wire terminals may be made difficult or impossible.

The time-element mechanism consists, essentially, of a zigzag or wavy spiral the axis of which is vertical. It is mounted on an insulating and suitably-constructed base. Through the center of both the spiral piece and the base is drilled a hole large enough to allow a metal plunger to pass freely up and down. The function of this plunger is to elevate a smooth spherical ball from the bottom of the base to the top of the spiral. The ball then descends by traveling round the zigzag till it reaches the base, where it enters into a sloping groove cut out in the base. The bottom of this groove is furnished with a metallic contact-piece connected to a suitable terminal properly mounted on the outside of the base. This metallic contact-piece extends nearly the whole length of the groove, but does not touch the plunger. The ball runs down this groove till it rests against the side of the plunger, thus making electrical contact with it and the metallic bottom piece. The circuit for energizing the relay-magnet of the next switch in the series is completed by means of a second terminal mounted on the base, which is fitted with a light metallic spring-piece formed so as to press against the side of the plunger, making electrical contact with it. The whole combination is mounted on an insulating-sole.

To cut out or break the lamp or supply circuits, the secondary-circuit switch at the central or switching-in point is opened to make dead the coils of the first relay-switch, so that its rotating armature may drop out, carrying with it the switch or switches of the first circuit and also the metallic plunger of the time-element mechanism. Before reaching the end of its travel the fall of the armature is arrested and brought slowly to rest in any suitable manner, whereby a slight time interval is allowed between the switching out of one circuit and breaking of the secondary circuit for the relay-coils of next circuit, and this may be repeated through as many circuits as necessary.

In order that our invention may be properly understood and readily carried into effect, we have hereunto appended three sheets of drawings, of which—

Figure 3:
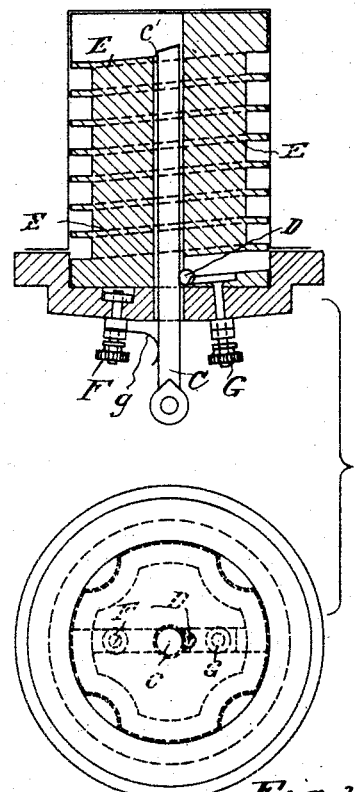
Figure 4:
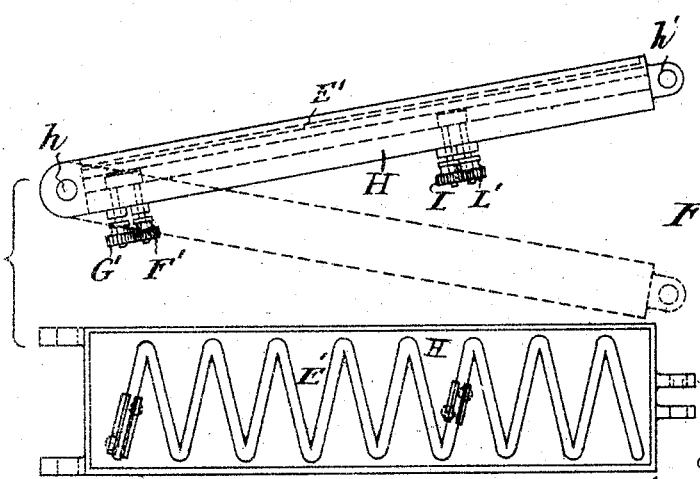
Figure 5:
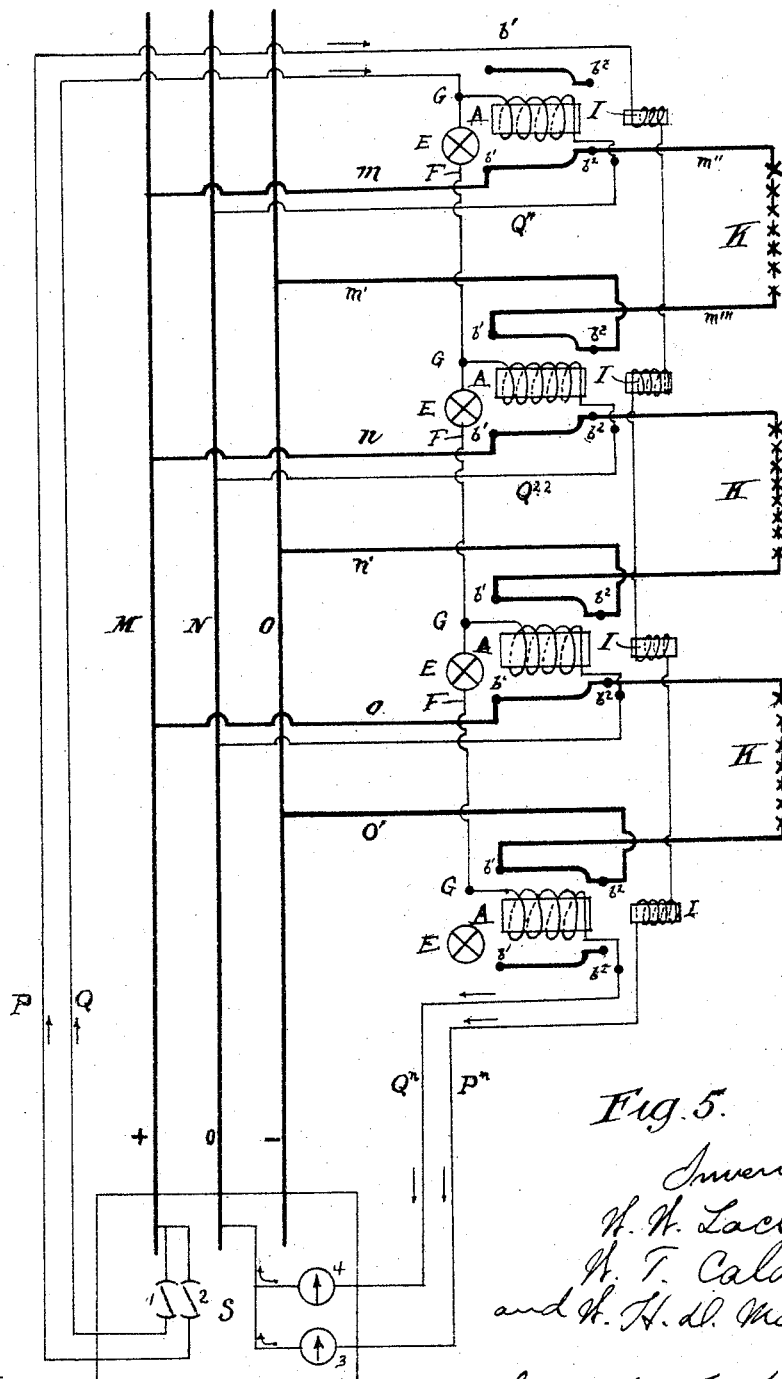

Figure 1$^a$ is a side elevation, Fig. 1$^b$ is a front elevation, and Fig. 1$^c$ is a plan, of a combination of switch and time element made in accordance with our invention. Fig. 2 is a part section and part elevation and plan, respectively, of a time element embodying our invention. Fig. 3 is a sectional elevation and plan of a modified form of a time element. Fig. 4 is a side elevation and plan of a further modification of a time element. Fig. 5 is a diagrammatic view of the connections, illustrating the application of our sets to three circuits of lamps, all hereinafter more fully referred to and described.

In the drawings, reference being made more particularly to Fig. 1, the electromagnet is marked A, the armature A', which is connected by an insulated link A$^2$ to the switch B at the point $b$. The switch B is fulcrumed at $b'$, which also constitutes the terminal for the ingoing current to the lamps, which current passes through the switch B to the terminal $b^2$ and onto the lamp. The link A$^2$ is formed in the shape of a bell-crank, as shown. The outer end of one of its arms is connected to the metallic plunger C at $c$, which plunger is more fully shown in the enlarged views of Figs. 2 and 3. The plunger C works up and down in a cylindrical passage C'. In other words, it responds to the movement of the armature A' through the link A$^2$. On the lower position of the plunger C a small metallic ball D rests on its tapered end. When the magnet A is excited, the armature is raised, which operation raises the plunger C, carrying the ball D to the top of the cylindrical passage. The ball then rolls by gravity from off the tapered ends of the said plunger C and slowly traverses the wavy spiral path E until it arrives at and rests between the terminals F and the plunger C, as indicated in full lines in the aforementioned figures. On the under side of the formation constituting the time element are mounted terminals G and F. The terminal F is in electrical connection with the plunger C through the spring $g$, which presses against it. The circuit between G and F is completed by the metallic ball D.

The modification illustrated in Fig. 4 consists of a flat slab of insulating material hinged at the end $h$, as shown, and is or may be actuated at the opposite end $h'$ by the armature A' through the link A$^2$. The full lines show it raised and the dotted lines in bottom position. On the upper surface of the slab H is cut or molded a zigzag groove or passage E' after the manner of the wavy spiral path E. (Shown in Figs. 2 and 3.) The function of the groove E' corresponds with the spiral passage E in the last-named figures. At the end of the groove next to the hinged end of the slab H are mounted two terminals G' and F', corresponding to the terminals G and F in Figs. 2 and 3 aforesaid, the electrical contact in this modification being made directly through the ball D.

Referring again to Fig. 1, I indicates a secondary electromagnet, with its armature J, which is hinged at $j$. The function of this armature is to support the armature A' while the lamps' circuits are lighted, with the electromagnet A dead to obviate the necessity of maintaining a current in the electromagnet A.

In Fig. 5, S is a central or lighting station, M, N, and O are the electricity-supply cables laid in the streets, P and Q are two small cables passing from the station S through the entire district which is served by the arc-starters, 1 and 2 are switches for connecting Q and P to the live cable M, 3 and 4 are indicators to show when the circuits P and Q on closing the switches 1 and 2 are complete round to connect to main supply-cable N. $m$ $m'$, $n$ $n'$, and $o$ $o'$ are cable connections for taking current from cable M through arc-starter switches B B to arc-lamps K and thence back to cable O. On passing a current of electricity from station S through cable Q in the direction indicated by arrows it operates the electromagnet A of arc-starter farthest away from S on drawings, and as soon as the time element E of this starter has completed its cycle the current is split up at the terminal G. Part of the current passes through E into Q' and on to the next starter of the series, where it operates the electromagnet A, as in the case of the first arc-starter. Part of the current in Q' is now by-passed through the time element E after it has completed its cycle through cable Q$^2$ on to third arc-starter, and so on. The part of the current from cable Q which passes through the electromagnets A A is returned to the street-supply cable N through the cables Q' Q$^2$ in all the starters except the last one— that is, the one nearest the station S. In this case the current from Q through electromagnet A comes through Q" through indicator 4 in station S to cable N. On passing a current through the electromagnets A the switches B B are closed and form a metallic connection between the terminals $b'$ and $b^2$, thus forming a path for the electric current to pass from the supply-main M to terminal $b'$ and through switch B on one side of one arc-starter, through terminal $b^2$ of same starter, then through the lead or cable $m''$ to the arc-lamps K, and then through cable $m'''$ to next starter, through its terminal $b'$, switch B, terminal $b^2$, returning from there through cable $m'$ to the street-supply main O. On closing the switch 2 in station S a current of electricity passes from the live main M through the cable P and energizes the secondary electromagnets I I I. On energizing the electromagnets I I I they attract their armatures J J, which are hinged at $j\ j$, which operation releases the armatures A' A', and so allows them to fall to their bottom position, carrying with them the switches B B, thus breaking the circuits of supply of current to the arc-lamps K K.

In the modification of time element Fig. 4 the terminals L and L' provide a time interval between the energizing or exciting of electromagnet I of one set or group and that of the next set or group. The circuits supplying the electromagnets A and I are complete throughout the entire series, starting from and returning to the central station, indicating through indicators whether or not the circuits have been completed at switching in and out of lamp-circuits K K K.

We claim—

1. The combination with the main circuit, of a plurality of electrically-operated switches, a plurality of time-switches successively actuated by the electrically-operated switches, and circuits branched from the main circuit, connecting the time-switches with the electrically-operated switches and controlled by the time-switches to cause the time-switches to successively operate the electrically-operated switches.

2. The combination with the main circuit, of a plurality of electrically-operated switches, a plurality of time-switches successively actuated by the electrically-operated switches, circuits branched from the main circuit, connecting the time-switches with the electrically-operated switches and controlled by the time-switches to cause the time-switches to successively operate the electrically - operated switches, and means for retarding the action of the time-switches.

In testimony whereof we affix our signatures in presence of two witnesses.

WILLIAM WALKER LACKIE.
WILLIAM TANNAHILL CALDERWOOD.
WILLIAM HENRY DUNCAN MacEWEN.

Witnesses:
JOHN LIDDLE,
JOSEPH H. PEARSON.